(12) United States Patent
Uttaro

(10) Patent No.: US 8,611,357 B2
(45) Date of Patent: *Dec. 17, 2013

(54) MPLS VIRTUAL PRIVATE NETWORK USING MULTIPLE NETWORK CORES

(75) Inventor: James Uttaro, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,933

(22) Filed: Aug. 8, 2012

(65) Prior Publication Data

US 2012/0300634 A1    Nov. 29, 2012

Related U.S. Application Data

(63) Continuation of application No. 12/636,907, filed on Dec. 14, 2009, now Pat. No. 8,259,730, which is a continuation of application No. 11/881,352, filed on Jul. 26, 2007, now Pat. No. 7,656,876, which is a continuation of application No. 10/328,060, filed on Dec. 23, 2002, now Pat. No. 7,257,119.

(51) Int. Cl.
*H04L 12/28* (2006.01)

(52) U.S. Cl.
USPC .................. 370/395.1; 370/392; 370/474

(58) Field of Classification Search
USPC ......... 370/401, 389, 392, 466, 467, 473, 474, 370/410 M, 422, 395.1
See application file for complete search history.

(56) References Cited

U.S. PATENT DOCUMENTS

| | | | |
|---|---|---|---|
| 6,198,723 B1 * | 3/2001 | Parruck et al. | 370/230.1 |
| 6,339,488 B1 | 1/2002 | Beshai et al. | |
| 6,473,421 B1 | 10/2002 | Tappan | |
| 6,477,166 B1 | 11/2002 | Sanzi et al. | |
| 6,493,349 B1 | 12/2002 | Casey | |
| 6,618,761 B2 * | 9/2003 | Munger et al. | 709/241 |
| 6,628,649 B1 * | 9/2003 | Raj et al. | 370/360 |

(Continued)

FOREIGN PATENT DOCUMENTS

EP    1187406    3/2002

OTHER PUBLICATIONS

USPTO, "Notice of Allowance," issued in connection with U.S. Appl. No. 10/328,060, on Apr. 23, 2007 (5 pages).

(Continued)

*Primary Examiner* — Creighton Smith
(74) *Attorney, Agent, or Firm* — Hanley, Flight & Zimmerman, LLC

(57) ABSTRACT

Examples of multi-protocol label switching networking using multiple network cores are disclosed. Example methods disclosed herein to route data in a multi-protocol label switching network include providing an incoming data packet in parallel to a plurality of network cores of the multi-protocol label switching network to cause a respective plurality of alternative paths in the plurality of network cores to be determined for routing the incoming data packet, each alternative path being associated with a respective network core, each network core including a respective plurality of routers, obtaining a plurality of weights associated with the plurality of alternative paths, and selecting, based on the plurality of weights, a first alternative path in a first network core to route the incoming data packet in the multi-protocol label switching network, the first alternative path being selected from among the respective plurality of alternative paths in the plurality of network cores.

16 Claims, 1 Drawing Sheet

(56) References Cited

U.S. PATENT DOCUMENTS

| | | | |
|---|---|---|---|
| 6,859,842 B1 * | 2/2005 | Nakamichi et al. | 709/238 |
| 7,257,119 B2 | 8/2007 | Uttaro | |
| 7,656,876 B1 | 2/2010 | Uttaro | |
| 2002/0021675 A1 | 2/2002 | Feldmann | |
| 2010/0091781 A1 | 4/2010 | Uttaro | |

OTHER PUBLICATIONS

USPTO, "Notice of Allowance," issued in connection with U.S. Appl. No. 10/328,060, on Jun. 13, 2007 (2 pages).

USPTO, "Office Action," issued in connection with U.S. Appl. No. 11/881,352, on Aug. 5, 2009 (4 pages).

USPTO, "Notice of Allowance," issued in connection with U.S. Appl. No. 11/881,352, on Dec. 2, 2009 (6 pages).

USPTO, "Office Action," issued in connection with U.S. Appl. No. 12/636,907, on Jan. 19, 2012 (5 pages).

USPTO, "Notice of Allowance," issued in connection with U.S. Appl. No. 12/636,907, on May 11, 2012 (7 pages).

* cited by examiner

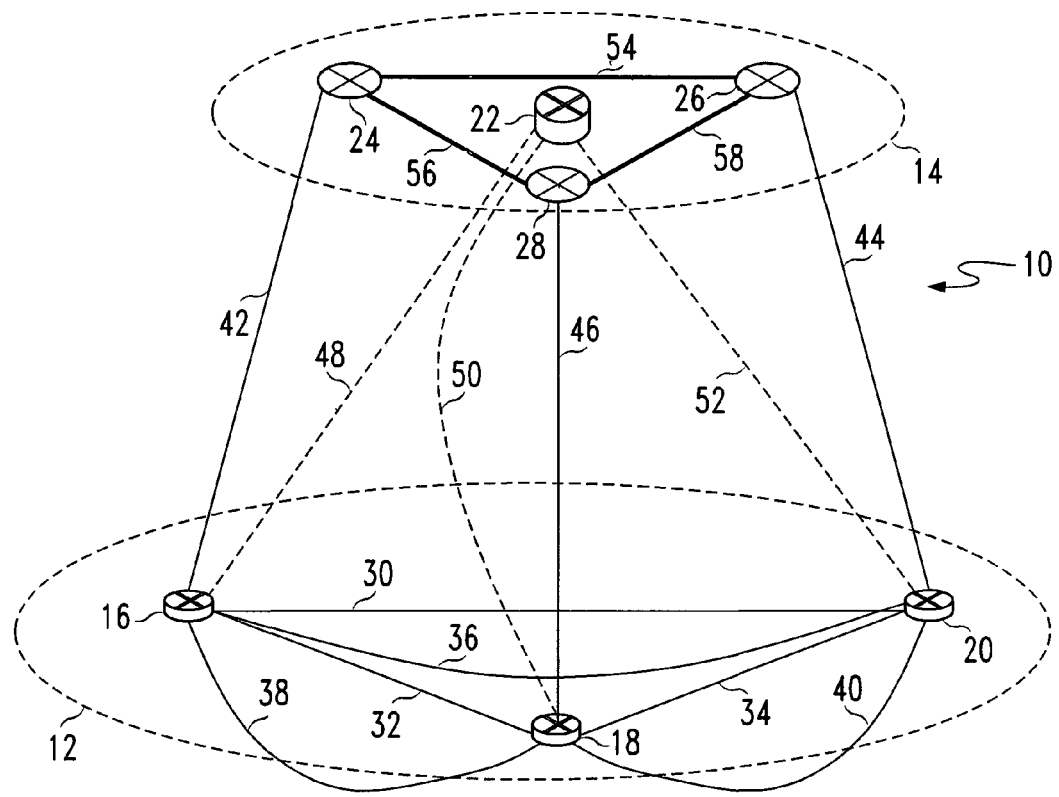

MPLS VIRTUAL PRIVATE NETWORK USING MULTIPLE NETWORK CORES

RELATED APPLICATION(S)

This patent arises from a continuation of U.S. patent application Ser. No. 12/636,907, entitled "MPLS VIRTUAL PRIVATE NETWORK USING DUAL NETWORK CORES" and filed on Dec. 14, 2009, which is a continuation of U.S. patent application Ser. No. 11/881,352 (now U.S. Pat. No. 7,656,876), entitled "MPLS VIRTUAL PRIVATE NETWORK USING DUAL NETWORK CORES" and filed on Jul. 26, 2007, which is a continuation of U.S. patent application Ser. No. 10/328,060 (now U.S. Pat. No. 7,257,119), entitled "MPLS VIRTUAL PRIVATE NETWORK USING DUAL NETWORK CORES" and filed on Dec. 23, 2002, all of which are hereby incorporated by reference in their entireties.

FIELD OF THE DISCLOSURE

The present disclosure relates generally to a MPLS data network system and more particularly to a MPLS system where multiple cores can be used for transporting data and different weights are assigned to the different cores.

BACKGROUND

The present day worldwide web is composed of a number of interconnected data networks throughout the world. These data networks may be of a number of different types, and were developed by different providers, based on different protocols. More recently, a MPLS (multi-protocol label switching) network has been designed which allows various dissimilar data packets to be carried by the same network with the addition of new labels, which are recognized by the MPLS system, regardless of the source of the original data. Thus, the MPLS network may be connected to dissimilar networks and carry packets of data between them.

Entry points to a MPLS network are known as label edge routers. Such a router can accept traffic from different sources and thus may be connected to different networks. Data packets are assigned labels as they enter the network. These labels can provide a mechanism to group related sets of the packets together and isolate one group of packets from another. Thus, the packets are forwarded at layer 2, which eliminates the need for layer 3 forwarding between nodes. This simplifies the forwarding process and results in high speed and high performance.

Arrangements of MPLS networks are seen, for example, in U.S. Pat. Nos. 6,477,166 and 6,473,421.

The MPLS network can be used successfully by network service providers, which provide a virtual private network service for their customers. That is, the data stream can be controlled without having to stop at every node along the path by setting up an end-to-end label-switching path. However, further improvements in these networks are possible, especially in a circumstance where a system is being replaced or upgraded in order to avoid any loss of service for the customer.

SUMMARY

Accordingly, the present disclosure provides a method for using multiple network cores in a MPLS system.

Also, the present disclosure provides a system for using two or more network cores to provide a virtual private network in a MPLS system.

The present disclosure further provides a system for providing dual network cores in a MPLS system where different weights are provided for the different cores.

The present disclosure still further provides a method for weighting routes in dual network cores in a MPLS system.

The present disclosure further provides a MPLS virtual private network using dual network cores where the route through one core has a different weighting than the route through the other.

Briefly, this is achieved by providing a network having multiple cores within the network with addresses provided over both cores and a selection made based on a weight assigned to the different cores.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawing, wherein:

The FIGURE is a diagram showing the system of the present disclosure.

DETAILED DESCRIPTION

Referring now to the drawing, wherein the present system is shown as 10. This system includes two different network cores 12 and 14. Each core includes a series of routers. In network 12, routers 16, 18 and 20 are shown. In network 14, routers 24, 26 and 28 are shown. Network 14 also includes a route reflector 22.

The routers in network 12 are connected to each other as shown by lines 30, 32 and 34. Likewise, the routers in network 14 are connected by lines 54, 56 and 58. While these are shown as individual lines, in fact each of the lines may include a series of other routers along the way. Also, of course, each of the networks contains considerably more than three routers.

In addition to the lines for carrying data between the routers, there are also connections to establish addresses between the various routers. Thus, in network 12 these are labeled as 36, 38 and 40. When data packets are passed from one router to another, a path is first established by advertising addresses to other routers in the network. The path is then established before the data packet is passed. It is also possible for data to be transferred between routers in different networks. Thus, lines 42, 44 and 46 connect corresponding routers in different networks.

A route reflector 22 is also provided in network 14 to advertise addresses between the two different networks. Thus, address connections 48, 50 and 52 are provided between this route reflector and the routers of network 12.

In operation, incoming data packets are connected to a label edge router in each core. Alternatively, one edge router may be used which is connected to routers in both cores. When data is set to be transferred, a private virtual network is established by advertising addresses in both cores. Two different paths are established with one path in each core. This arrangement allows a permanent virtual circuit to be formed in each network so that the data can be carried in either network. Weights are assigned to the different paths. If the weights are equal, the various packets will balance the load of the traffic over each core. However, normally one route will be favored over the other and assigned a higher weight. This is manually configured into the network. As a result, packets are carried through one core rather than the other under normal conditions. However, this arrangement provides the ability of the other core to also carry the data.

This arrangement can be especially useful in certain circumstances. Thus, if the system is being upgraded to a different type of network, it is possible to slowly bring data into the new network as it is being implemented. Thus, customers can be migrated from one network core to another. It is also possible to use both cores in order to increase the capacity of the system. It further provides the ability to use different parallel carriers when necessary.

In operation, if the input is connected to router 16 which operates as the edge router, a first path is established in network 12 by first advertising addresses over connections 36, 38 and 40 and a path is established across the network using paths 30, 32 and 34. Of course, both the addressing and data paths have many more possible combinations. At the same time, a second path is configured through network 14 by advertising addresses with route reflector 22 as indicated by 48, 50 and 52. The route is then established using routers 24, 26 and 28 and data paths 54, 56 and 58. However, once the two paths are established, a weight is given to each path, which is preset into the networks manually. The weighting causes one path to be favored over the other.

It is also possible to utilize two cores merely as redundancy feature to avoid problems with quality of service or to handle overload situations.

Numerous additional modification and variations of the present disclosed teachings are possible in light of the above teachings. It is therefore to be understood that within the scope of the appended claims, the disclosed teachings may be practiced otherwise than as specifically described herein.

What is claimed is:

1. A method to route data in a multi-protocol label switching network, the method comprising:
    providing an incoming data packet in parallel to a plurality of network cores of the multi-protocol label switching network to cause a respective plurality of alternative paths in the plurality of network cores to be determined for routing the incoming data packet, each alternative path being associated with a respective network core, each network core including a respective plurality of routers;
    obtaining a plurality of weights associated with the plurality of alternative paths; and
    selecting, based on the plurality of weights, a first alternative path in a first network core to route the incoming data packet in the multi-protocol label switching network, the first alternative path being selected from among the respective plurality of alternative paths in the plurality of network cores.

2. A method as defined in claim 1 wherein the plurality of alternative paths are determined by:
    advertising addresses in a first network core;
    establishing the first alternative path in the first network core using the addresses advertised in the first network core;
    advertising addresses in a second network core; and
    establishing a second alternative path in the second network core using the addresses advertised in the first network core.

3. A method as defined in claim 1 wherein the plurality of alternative paths comprise the first alternative path in the first network core and a second alternative path in a second network core, and obtaining the plurality of weights comprises:
    obtaining a first weight associated with the first alternative path; and
    obtaining a second weight associated with the second alternative path.

4. A method as defined in claim 3 wherein selecting the first alternative path based on the plurality of weights comprises:
    evaluating the first weight and the second weight; and
    selecting the first alternative path and not selecting the second alternative path to route the incoming data packet when the first weight and the second weight are different.

5. A method as defined in claim 3 wherein selecting the first alternative path based on the plurality of weights comprises:
    evaluating the first weight and the second weight; and
    using load balancing to determine whether to route the incoming data packet via the first alternative path or the second alternative path when the first weight and the second weight are equal.

6. A method as defined in claim 1 further comprising:
    providing the input data packet from an edge router to each of the plurality of network cores; and
    routing the input data packet across only one of the plurality of network cores based on the plurality of weights.

7. A method as defined in claim 1 wherein the plurality of alternative paths comprises a plurality virtual circuits formed in the respective plurality of network cores.

8. A method as defined in claim 1 wherein the plurality of alternative paths are determined at substantially a same time.

9. A multi-protocol label switching network comprising:
    a plurality of network cores, each network core including a respective plurality of routers; and
    an edge router in communication with each of the plurality of network cores, the edge router to perform operations comprising:
        providing an incoming data packet in parallel to the plurality of network cores to cause a respective plurality of alternative paths in the plurality of network cores for routing the incoming data packet to be determined, each alternative path being associated with a respective network core;
        obtaining a plurality of weights associated with the plurality of alternative paths; and
        selecting, based on the plurality of weights, a first alternative path in a first network core to route the incoming data packet in the multi-protocol label switching network, the first alternative path being selected from among the respective plurality of alternative paths in the plurality of network cores.

10. A network as defined in claim 9 wherein the plurality of alternative paths are determined by:
    advertising addresses in a first network core;
    establishing the first alternative path in the first network core using the addresses advertised in the first network core;
    advertising addresses in a second network core; and
    establishing a second alternative path in the second network core using the addresses advertised in the first network core.

11. A network as defined in claim 9 wherein the plurality of alternative paths comprise the first alternative path in the first network core and a second alternative path in a second network core, and obtaining the plurality of weights comprises:
    obtaining a first weight associated with the first alternative path; and
    obtaining a second weight associated with the second alternative path.

12. A network as defined in claim 11 wherein selecting the first alternative path based on the plurality of weights comprises:
   evaluating the first weight and the second weight; and
   selecting the first alternative path and not selecting the second alternative path to route the incoming data packet when the first weight and the second weight are different.

13. A network as defined in claim 11 wherein selecting the first alternative path based on the plurality of weights comprises:
   evaluating the first weight and the second weight; and
   using load balancing to determine whether to route the incoming data packet via the first alternative path or the second alternative path when the first weight and the second weight are equal.

14. A network as defined in claim 9 wherein the operations further comprise:
   providing the input data packet from an edge router to each of the plurality of network cores; and
   causing the input data packet to be routed across only one of the plurality of network cores based on the plurality of weights.

15. A network as defined in claim 9 wherein the plurality of alternative paths comprises a plurality virtual circuits formed in the respective plurality of network cores.

16. A network as defined in claim 9 wherein the plurality of alternative paths are determined at substantially a same time.

* * * * *